United States Patent [19]

Hughes

[11] 4,026,013
[45] May 31, 1977

[54] METHOD AND STRUCTURE FOR TERMINATING FINE WIRES

[75] Inventor: Donald Kent Hughes, Mechanicsburg, Pa.

[73] Assignee: AMP Incorporated, Harrisburg, Pa.

[22] Filed: Mar. 17, 1976

[21] Appl. No.: 667,773

[52] U.S. Cl. .............................. 29/628; 339/276 R; 29/754
[51] Int. Cl.² ...................................... H01R 43/00
[58] Field of Search ............ 339/95 R, 95 D, 97 R, 339/97 P, 98, 99 R, 176 MF, 276; 29/203 D, 203 DT, 628

[56] References Cited

UNITED STATES PATENTS

| | | | |
|---|---|---|---|
| 2,603,680 | 7/1952 | Snyder | 339/276 |
| 3,277,425 | 10/1966 | Marshall | 339/176 MF |
| 3,950,067 | 4/1976 | Leavesley | 339/176 MF |

Primary Examiner—Lowell A. Larson
Attorney, Agent, or Firm—William J. Keating; Donald W. Phillion

[57] ABSTRACT

An apparatus for terminating a very fine magnet wire and which, in doing so, becomes the permanent termination thereof. A three sided contact forming three sides of a trapezium has the center side form an acute angle with the serrated second side and an obtuse angle with the third side. A housing has a cavity therein for receiving and retaining the contact. The cavity contains a stopping means against which the junction of the first and center contact sides abut as the contact is inserted into said housing. However, the third contact side continues further into the cavity to alter the said acute and obtuse angles towards right angles, thereby pushing the serrated second contact side in a direction normal to the insertion force and against a given wall of the housing and across which the magnet wire has been positioned.

19 Claims, 20 Drawing Figures

200

201

202

203

204

METHOD AND STRUCTURE FOR TERMINATING FINE WIRES

BACKGROUND OF THE INVENTION

This invention relates generally to the termination of very fine wires such as employed in clock motors, telephone hand sets, appliance timers and in general, small coils, and more particularly it relates to a method, apparatus and product for effecting such termination wherein the steps of the method are performed by the apparatus which, upon completion of the termination, itself becomes the terminating connector.

The termination of small magnet wires has presented numerous difficulties, largely because of the fineness and inherent frailties of such wires. Particularly troublesome are the very small gauge magnet wires employed on coils employed in devices such as appliance timers, clock motors and telephone hand sets wherein the wire size is of the order of number 32 gauge to a number 50 gauge.

Currently, such very small magnet wires are terminated by a human operator who initiates the winding of the fine wire coils on the bobbin to be used in the timer or clock motor, for example, and then, at the completion of the winding, usually done by automatic equipment, manually twists the two free ends of the coil around the two ends of a pair of much heavier lead wires. The lead wires, with the magnet wires twisted therearound, are then dipped into a solder bath which is sufficiently hot to melt the rather tough insulation which is still on the magnet wires and to solder said magnet wires to the lead wires.

The afore-mentioned method of terminating very fine magnet wires presents certain problems. More specifically, since the wires are so fine and so frail, they can be broken internally within their insulation sheaths merely by being handled by the human operator, with the break being undetectable except by an electrical check. Occasionally, the operator will even believe the magnet wire has been wound around a lead wire, when in fact it has slipped away from between her fingers and has not been wound around the lead wire. On other occasions, the fine magnet wire may be completely broken at some point, including the insulation, and the assembler will not be aware of the break due to the fineness of the wire.

Since the damaged magnet wires are not easily detected, construction of the defective unit might be well along before discovery of the fault occurs. Because of the nature of the structure it is virtually impossible to repair the broken wire. As a result the entire assembly must be discarded.

BRIEF STATEMENT OF THE INVENTION

It is a primary object of the invention to provide a means for terminating the ends of very fine magnet wires without the use of solder and with a minimum of handling by a human operator.

It is a second purpose of the invention to provide a solderless connection of very fine magnet wires to much heavier gauge lead wires with the breakage rate of said magnet wires being substantially less than obtainable with terminations employed heretofore.

A third purpose of the invention is a method for terminating very fine magnet wires in the gauge range of from 32 to 50 with a minimum of handling of said wires by human operators and without the need for solder.

A fourth aim of the invention is an apparatus for terminating a very fine magnet wire wound upon a bobbin with less human handling and damage rate than heretofore obtainable.

A fifth object of the invention is an apparatus for terminating the ends of a very fine magnet wire without the use of solder and with less human handling and subsequent damage rates than obtainable heretofore.

A sixth object of the invention is an apparatus which will perform certain method steps to terminate the very fine magnet wires and upon completion of such steps will become the permanent terminating means for said magnet wire.

A further object of the invention is to provide a structure which functions as an apparatus to perform a process which terminates a very fine magnet wire and, upon completion of said process, becomes in fact the permanent terminating connecting means for said magnet wire, all without the use of solder.

A further aim of the invention is the improvement of termination means for very fine magnet wires generally.

STATEMENT OF THE INVENTION

In accordance with one form of the invention there is provided a contact element formed from a thin strip of material into a three sided configuration which form three sides of a trapezium. A connector housing, having a cavity formed therein is constructed to receive the contact whose trapezium configuration changes as it is inserted into the housing cavity because of the shape of said cavity. Before insertion the contact configuration has first and second oppositely positioned sides connected together at first ends thereof by the remaining third side. The said third side forms an acute angle with the first side and an obtuse angle with the second side.

The cavity is constructed to receive different portions of the contact to different depths. More specifically, the cavity will continue to receive the second side of the contact, which has locking lances thereon, after insertion of the first side has been halted by a stop wall means at the bottom of the cavity. The width of the cavity, defined by first and second side walls between which the first and second sides of the contact are retained, is greater than the distance between the outside surfaces of first and second sides of the contacts, at the first ends thereof, before the contact is inserted in said cavity.

In its fully inserted position, however, and because of the cavity configuration, the first and second sides of the contact will be spread apart so that the outer surface of the first side will be forced against the said first side wall of the cavity. More specifically, the spreading apart of the first and second sides of the contact is caused by the second side of the contact continuing to move farther into the housing after movement of the first side has been stopped by the first end thereof striking the stop means. The continuation of the movement of the second major surface into the cavity results in the forcing of the third side against the stop means and into a vertical position with respect to the second side, thereby changing the angles which said third side forms with said first and second sides towards substantially right angles. Consequently, the distance between the first ends of the first and second sides will increase and force the outer surface of the first side against the first side wall of the cavity.

The housing is further constructed to have a slot extend completely therethrough except for the first side wall against which the outer face of the first side is forced. Prior to insertion of the contact into the housing a magnet wire has been wound into said slot and around said side wall for several turns. Because the lateral movement of the first side towards the first side wall of the cavity does not occur until after the first end of said first side has abutted against the stop means, such lateral movement is perpendicular to the plane of said side wall and the serrations on said outer surface of said first side will move directly and perpendicularly into contact with the magnet wire, and with no appreciable movement along the length of said magnet wire. The outer surface of said first side can have serrations or irregularities formed therein which bite through the insulation on said magnet wire when said outer surface of said first side is forced against the first side wall of the cavity.

In accordance with a feature of the invention the structure described above is both a product and an apparatus, with the apparatus performing the process of terminating the magnet wire and, because of having performed said process, thereby becomes a terminating connector product.

In accordance with still another feature of the invention a fourth element of the contact is constructed to cooperate with the inner surface of the first major side as to receive a lead wire poked thereinbetween to connect a relatively large gauge lead wire to the fine magnet wire through the contact.

In accordance with still another feature of the invention there can be substituted for said fourth element other means for terminating the large gauge lead wire, such as for example, a wire barrel, a solder tab, a wire wrap pin, or spade receptacle.

In accordance with yet another feature of the invention the insertion of the terminal into the housing can be effected by a pair of driving means, one of which forces the first side of the terminal into the housing and the second of which forces the second side of the terminal into the housing. The first side of the housing frictionally engages the sides of the housing with sufficient force so that when the first driving means terminates and the second driving means continues to drive the second side of the terminal into the housing the position of the first side will remain fixed and the third side of the terminal will be moved into a vertical position to force said first side of said terminal against the housing as discussed above. In this form of the invention it is not necessary that the junction between the first and third sides be driven against a stop wall in order to move the first side upwardly against the housing.

BRIEF DESCRIPTION OF THE DRAWINGS

The aforementioned objects and features of the invention will be more fully understood from the following detailed description thereof when read in conjunction with the drawings in which.

DETAILED DESCRIPTION OF THE INVENTION

Figure 1:
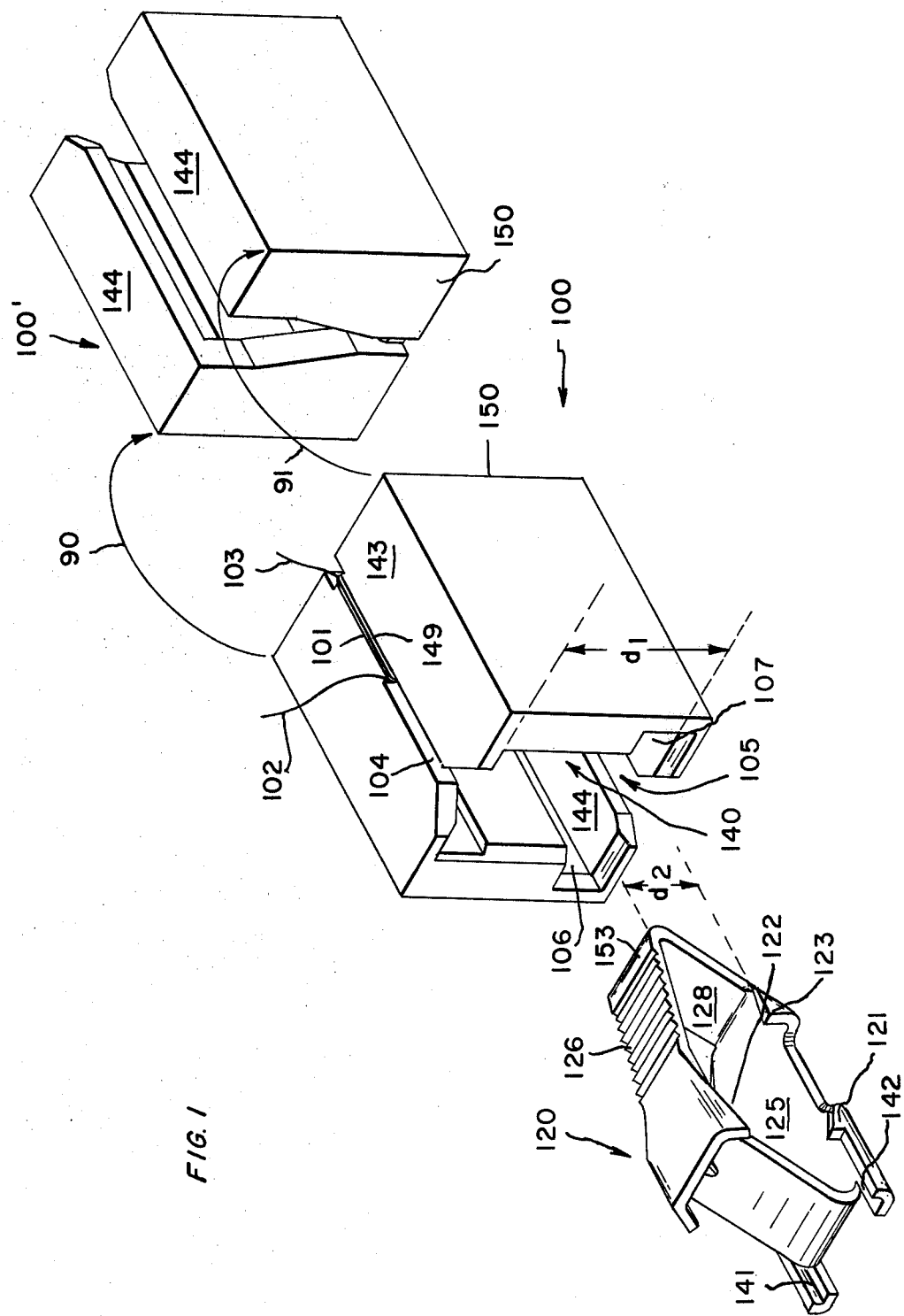
FIG. 1 shows a perspective view of the invention including two views of the housing and one form of the contact, with the contact in a non-inserted position with respect to the housing.

Referring now to FIG. 1 the connector housing is designated generally by reference character 100 and the contact, shown before insertion into the housing 100, is designated generally by reference character 120. The housing 100 is also shown flipped over 180° as indicated by arrows 90 and 91 and is designated by reference character 100' in its flipped over position.

The housing 100 is generally block-shaped with a cavity 140 formed therein. The cavity 140 is defined on two sides by the side walls 143 and 144, each of which has a slot therein. The slot 105 extends the entire length of side wall 144 and along the end or stopping wall 150, as can be seen from FIGS. 6 and 7. A slot 104 extends part way down the side wall 143 leaving a section of the side wall 143 intact and around which three or four turns of coil 101 can be wrapped, with the two free ends 102 and 103 extending therefrom.

Figure 6:
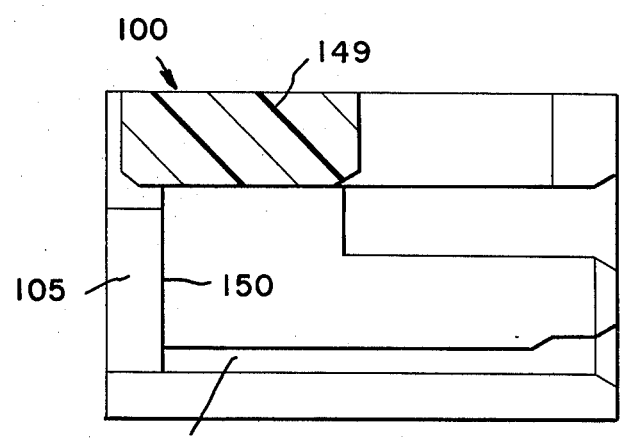
FIG. 6 shows a sectional view of the structure of FIG. 5 taken along the plane A—A.
Figure 7:
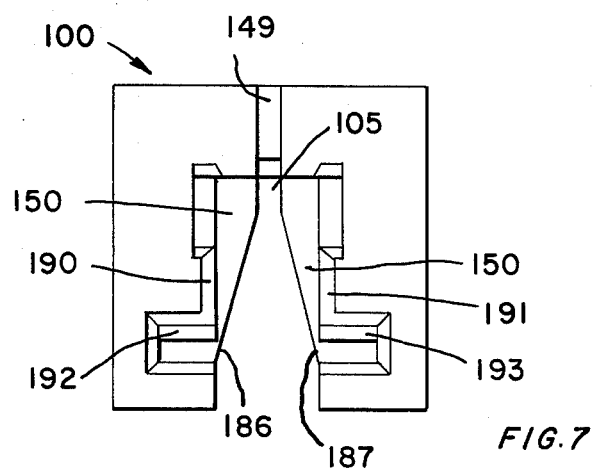
FIG. 7 shows a top view of the structure of FIG. 5.

The winding of coil 101 around the intact portion 149 of side wall 143 is possible because the slot 105 extends the entire length of end wall 144 and across the end or stop means 150, as can be seen in FIGS. 6 and 7. It is to be understood that coil 101 is wound around the portion 149 of side wall 143 before the insertion of a contact 120.

Slots 106 and 107, which are part of cavity 140, are constructed to receive the tangs or lances 121, 123 and 122 formed on the lower side 125 of contact 120. Said slots 106 and 107 also receive the guide members 141 and 142, which are an extension of contact side 125. The overall effect of the insertion of the lances 121, 123 and the guiding members 141 and 142 into the slots 106 and 107 is to firmly position the contact 120 within the housing 100 in a desired position with respect to the surfaces of the cavity 140. The lances 121–123 dig into those portions of side walls 160 and 161 of housing 103 which define the grooves 106 and 107 and lock the bottom plate 125 of the contact therewithin against unauthorized withdrawal.

The contact 120 has an upper side 126 with a first end thereof connected to the first end of the bottom side 125 via a third side 128. It is to be noted that third side 128 forms an acute angle with the upper leg 126 and an obtuse angle with the lower element 125. Thus, as the contact 120 is inserted into cavity 140 in the direction of arrow 131, the nose portion 53, where the top and end elements 126 and 128 join, will abut against the end wall 150 of the cavity, thus restraining the nose portion 153 from further entry into cavity 140. However, the lower element 125 can and will travel into the slots 106 and 107 even after the top element 126 has been stopped by the end stopping wall means 150 (see FIGS. 6 and 7).

Figure 13:
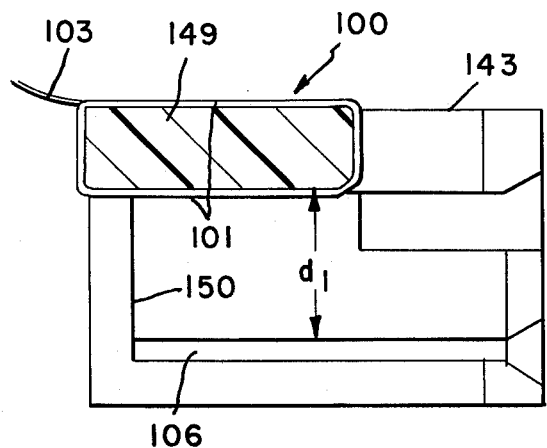
FIGS. 13, 13a and 13b show a three step sequence of the insertion of the contact into the housing to effect the termination of the very fine magnet wire.
Figure 13:
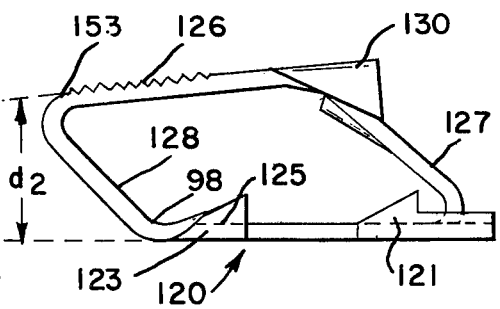
Figure 13A:
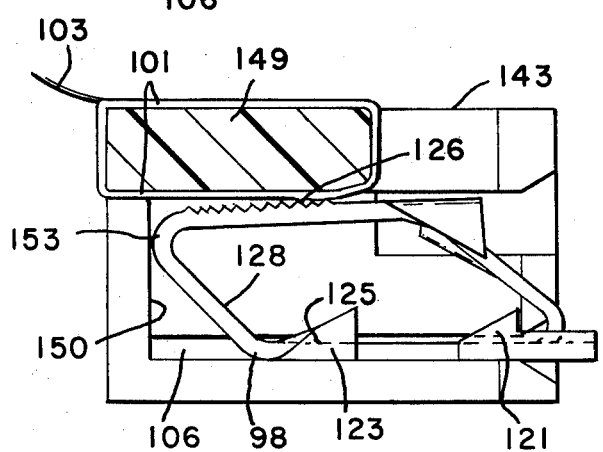
Figure 13B:
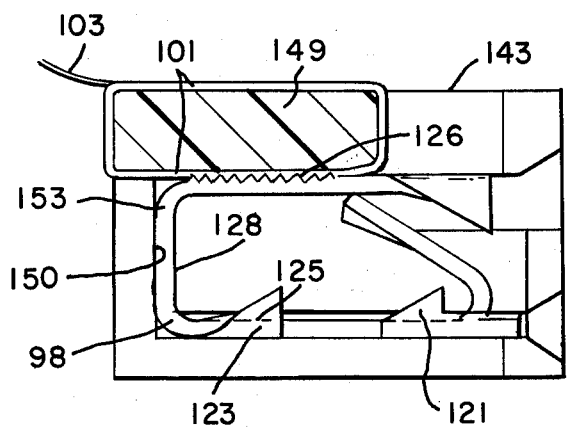

As the bottom plate 125 is inserted farther into cavity 140 the bottom end 98 of end plate 128 will be forced further into cavity 140 so that end plate 128 will eventually be forced flush against stopping wall 150, as shown in FIG. 13b.

Before referring specifically to FIGS. 13–13b it is noted that the distance between the inner surfaces of the upper wall 143 and the lower wall 144 is designated as $d_1$. The distance $d_1$ is greater than the distance $d_2$ measured from the top of the nose portion 153 (i.e., the junction of contact elements 126 and 128) to the bottom surface of the lower plate 125 of contact 120. Consequently, when contact 120 is inserted into the cavity 140, the top surface of the upper element 126 will move into the cavity 140 with a clearing distance equal to $d_1-d_2$ between the top surface of element 126 and the inner surface of the top wall 143 of housing 100. It is only after the nose 153 strikes the end plate 150, and the bottom element 125 of contact 200 continues to move forward thereby moving the end element 128 into a vertical position, that the upper surface of top element 126 is forced against the inner surface of the top wall 143 of connector 100.

FIGS. 13, 13a and 13b taken together show the interaction between the contact and the housing as the contact enters the housing. In FIG. 13 the housing 100 and the contact 120 are shown before insertion of the contact 120 into the housing 100. In FIG. 13a the contact 120 is shown inserted partially into the housing 100 to the point where the nose portion 153 is abutted against the stopping wall 150. However, the contact 120 has not been inserted to the point where the end element 128 of the contact begins to assume a vertical position.

In FIG. 13b the contact 120 is shown fully inserted into the cavity 140 so that the end element 128 is in a vertical position and resting flush against the stopping wall 150 of housing 100. As discussed above, the pushing of the end element 128 of contact 120 against stopping wall 150 is accomplished by continuing to insert the contact into the cavity after the nose 153 has engaged the stopping wall 150. The lower element 125 of contact 120 continues to move to the left in FIGS. 13–13b thereby moving the bottom end of end element 128 also to the left until it assumes an upright position flush against the stopping wall 150 of the housing 100. The lances 121 and 123 (see FIG. 1) dig into the side walls of housing 100 and lock the contact therewithin. When the insertion force is removed the contact 120 will remain in the housing in the position shown in FIG. 13b.

In the position of FIG. 13b it can be seen that the upper surface of the two element 126 has been moved upwardly in a direction substantially transverse to the direction of insertion force 131. The distances $d_1$ and $d_2$ are such that when the element 128 is in a vertical position, the upper surface of the upper top element 126 is pressed against the wire 101 which is wound around portion 149 of the upper wall 143 of housing 100.

Figure 14:
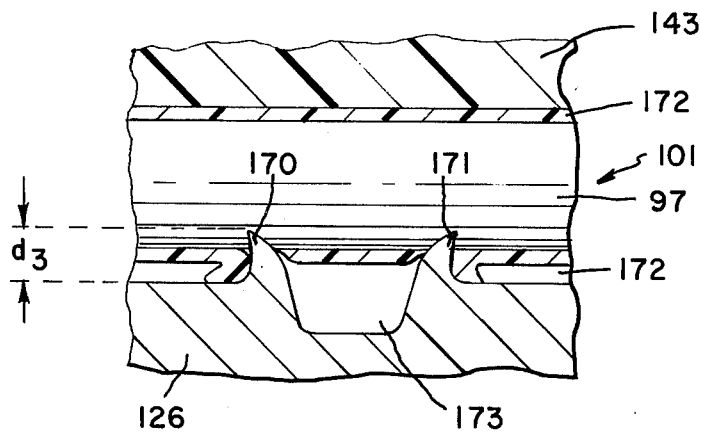
FIG. 14 shows an enlarged view of a pair of ridges located on the first major surfaces of the contacts as they penetrate through the insulative layer on the fine magnet wire and into the copper thereof.

The ridges or serrations which are formed on the outer surface of top element 126 of contact 120 cut through the insulation on the magnet wire 101 and dig into the metal of the copper wire. Reference is made to FIG. 14 which shows a much enlarged view of the serrations on the upper element 126 on the contact 120 penetrating through the insulation on wire 101 and digging into the copper thereof. The copper wire is designated generally by reference character 97 and the insulation therearound by reference character 172. A small portion of the upper element 126 of the contact 120 is also shown with two serrations 170 and 171 formed thereon. The serrations 170 and 171 can be formed by dragging a cutting tool across the surface of the contact and leaving a groove similar to the groove 173 in its wake. It can be seen that the sharp ridges or serrations 170 and 171 have cut through the insulation 172 of magnet wire 101 and have dug into the copper core 97 thereof and made electrical contact therewith. Also shown is a small portion of the upper wall 143 of housing 100 of FIG. 13.

As an illustration of the actual dimensions involved in FIG. 14 the heighth of the serrations 170, 171, designated as $d_3$, can be about 0.0006 inch, the thickness of the insulation 172 about 0.0002 inch and the diameter of the wire 101, in the case where the wire is a 50 gauge wire, about 0.0009 inch.

The penetration of serrations 170 and 171 into wire 97 is about 0.0002 inch. Two factors limit the penetration to this depth. The first factor is that serrations 170 and 171 must pass through insulation 172 which is approximately 0.0002 inch. Secondly, the forces applied to the conductor 101 by the top element 126 of the contact being forced thereagainst will, in fact, push the fine magnet wires 101 into the plastic of the upper wall 143 of the housing 100 a distance a few ten thousandths of an inch.

FIG. 14 also shows very clearly one of the more important features of the invention in that the magnet wire 101 is terminated between the serrated surface of the upper leg 126 of the contact and the originally smooth surface of the plastic wall 143 of the housing 100. The presence of the smooth surface of the plastic wall on one side of the magnet wire results in considerably less risk of damage to the very fine magnet wire during termination thereof since the wire can, in fact, form a shallow groove in the plastic wall and become partially embedded therein, thereby providing for relatively wide tolerances in the forms applied during insertion of the contact into the housing without breaking or severing the fine magnet wire. Furthermore, serrations 170 and 171 make contact with the copper wire 101 while moving in a direction perpendicular to the length of the wire, thereby minimizing breakage that would otherwise occur if there were a component of motion of serrations 170 and 171 parallel with the length of wire 101.

The housing 100 can be of a number of different materials, as for example, polyesters, polycarbonates, or the various types of nylon material. The contacts, such as contact 121, can be of brass or phos-bronze, for example, preferably with a coating of some type, such as tin or one of the noble metals. The use of such a coating is advantageous since a better electrical contact with the copper of the magnet wire is thereby obtained. A connection made directly between brass or phos-bronze and the copper of the magnet wire sometimes results in a boundary resistivity which is excessively high and unsuitable for certain applications.

Figure 2:
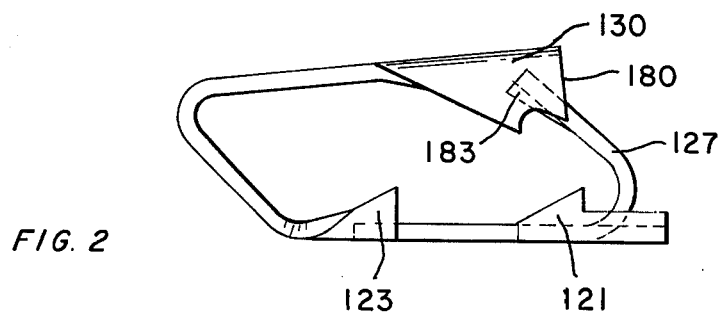
FIG. 2 is a side view of one form of the contact.
Figure 3:
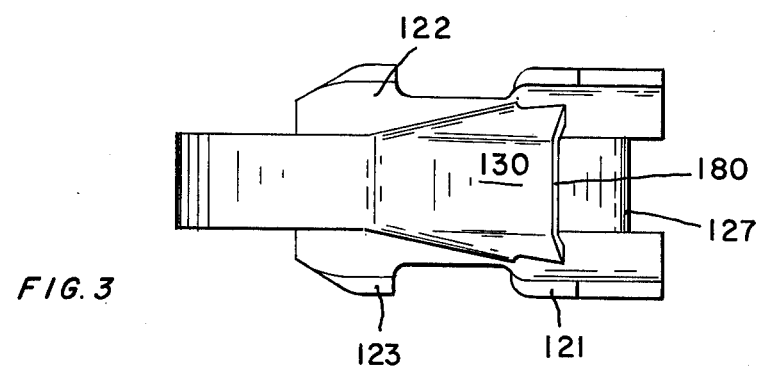
FIGS. 3 and 4 show the top view and the end view of the contact structure of FIG. 2.
Figure 4:
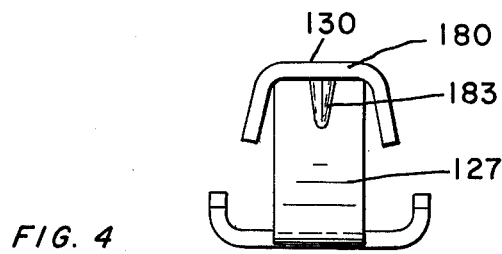

Referring again briefly to FIGS. 2 through 4, there are shown in detail three different views of the contact 120 of FIG. 1. In FIG. 2 for example, the tangs 121 and 123 are more clearly illustrated. The element 130, the end 180 thereof against which the insertion force is applied, and its relation to the end element 127, is also more clearly shown. More specifically, the end element 127 extends upwardly towards the top element 130 as shown in FIG. 2 but is not integrally connected therewith. Further, end element 127 has a V-shaped section 183 formed therein as shown in FIG. 4. Such V-shaped section 183 provides a guide for a lead wire which is inserted between the element 127 and the top element 130. Such lead wire is ordinarily of much heavier gauge than the fine magnet wire and is inserted after the contact 120 is inserted within the housing 100.

Figure 5:
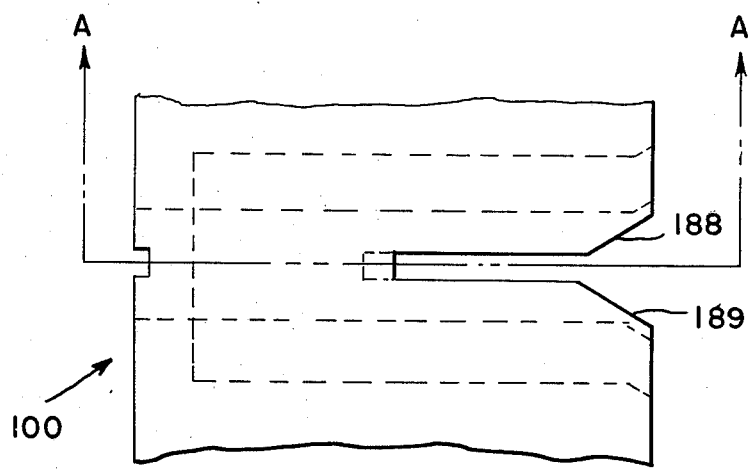
FIG. 5 shows a side view of the connector housing.

In FIGS. 5 through 7 there are shown three different detailed plan views of the contact 120 of FIG. 1. Various beveled edges are provided to facilitate the winding of a coil around the housing 100 of FIGS. 5 through 7 and also to facilitate the insertion of the contact 120 therein. More specifically, in FIG. 7 beveled edges 186 and 187, and in FIG. 5 the beveled edges 188 and 189, facilitate the winding of the coil around the section 149 of the top wall of the housing 100. The beveled edges 190, 191, 192 and 193 facilitate the entrance of the contact 120 into the housing 100.

Figure 8:
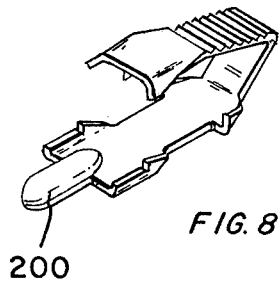
FIGS. 8, 9, 10, 11 and 12 show different configurations of the contact and more particularly show various configurations of the contact which connect to the lead wires in different manners.

In FIGS. 8, 9, 10, 11 and 12 there are shown various alternative configurations of the contact. In FIG. 8 the contact has an appendage 200 thereon which extends out of the housing 100 (FIG. ) after insertion of the contact therein and can be inserted, for example, through an aperture in a printed circuit board (not shown) and subsequently soldered to the printed circuit board.

Figure 9:
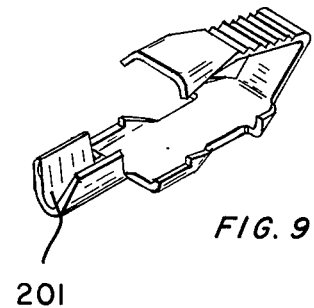

In FIG. 9 there is provided a barrel 201 within which the lead wire (not shown) can be crimped.

Figure 10:
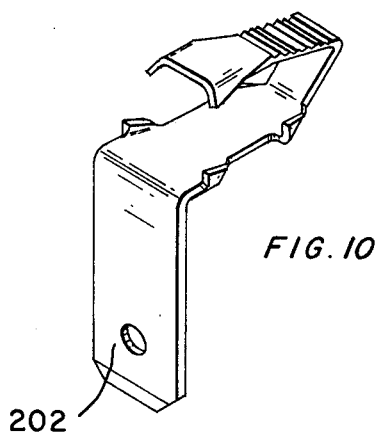

In FIG. 10 there is shown a tab 102 which can be either a solder tab or can be employed to receive another terminal which slips thereon and to which the lead wire is in turn connected.

Figure 11:
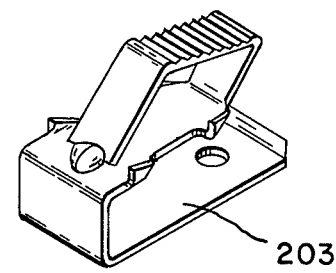

FIG. 11 shows a terminal similar to that of FIG. 10 except that the added element 203 is positioned at right angles to the corresponding element 202 of FIG. 10.

Figure 12:
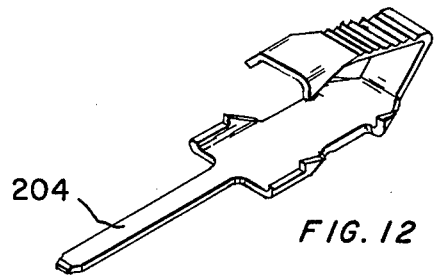

In FIG. 12 a post 204 is shown connected to the contact and around which a wire can be wrapped or a clip attached.

All of the elements 200 and 204 of FIGS. 8 through 12 extend out of the housing.

Figure 15:
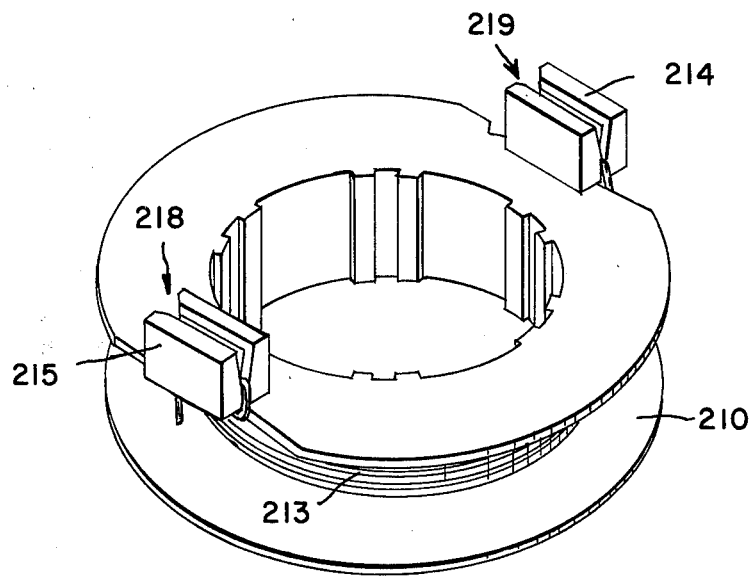
FIG. 15 is a perspective view of a pair of connectors mounted on the outer surface of the circumferential flange of a bobbin.

Referring now to FIG. 15 there is shown a bobbin 210 having a pair of housings 214 and 215 mounted on one of the flanges thereof. The housings 214 and 215 are similar to the housing 100 of FIG. 1. A winding 213 is wound around the bobbin 210 with the ends thereof wound through the slots 219 and 220 of the housings 214 and 215 and terminated therein by a contact such as contact 120 of FIG. 1. The slots 219 and 220 correspond to slot 105 of housing 100 of FIG. 1.

Figure 16:
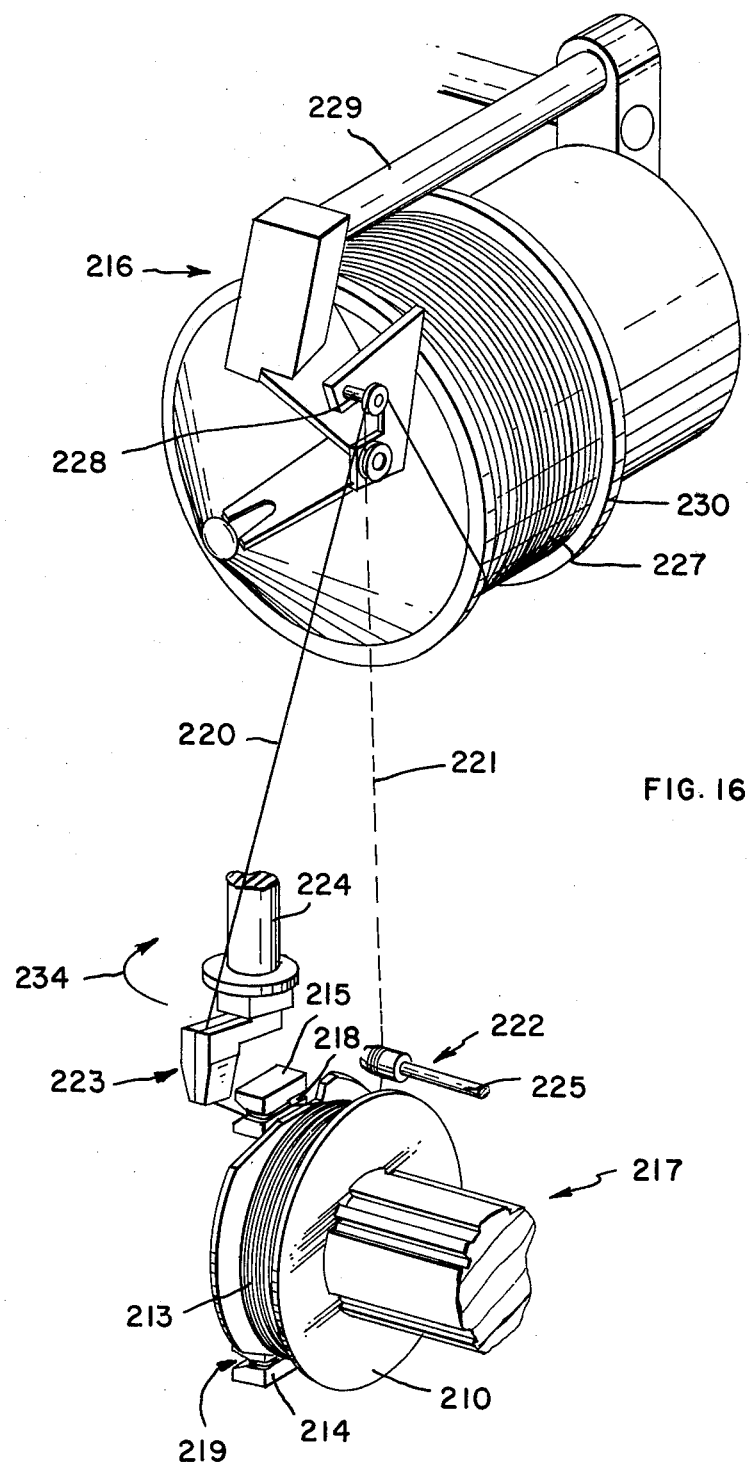
FIG. 16 is a perspective view of the bobbin of FIG. 15 positioned in the work station of a coil winder.

In FIG. 16 the bobbin 210 of FIG. 15 is shown positioned in a work station 217 under a coil winding machine 216 which winds the coil 213 therearound. The winding machine 216 also functions to wind the two ends of the coil a few turns into the slots 218 and 219 of housings 215 and 214. Contacts of the type shown in FIGS. 1 or 8–12 are then inserted into cavities such as cavity 219 in housing 214 either manually or by automatic insertion equipment. The winding machine 216 consists of a source of magnet wire 227 wound on a spool 230 which is attached to a supporting frame 229. A guiding means 228 feeds the wire to the work station 217 in two winding modes. In the first mode the wire, identified by reference character 221, passes over guide means 222 secured to shaft 224 and is wound upon the bobbin 210 which is rotated around its own axis.

Upon completion of the winding bobbin 210 another guide means, designated generally by reference character 223, is caused to rotate upon shaft 224 to wind the wire, now identified by reference character 222, in a second mode around the terminal housing 215. State of the art winding and insertion machines are adequate to perform the winding and insertion functions required by the assembly of FIG. 16.

Figure 17:
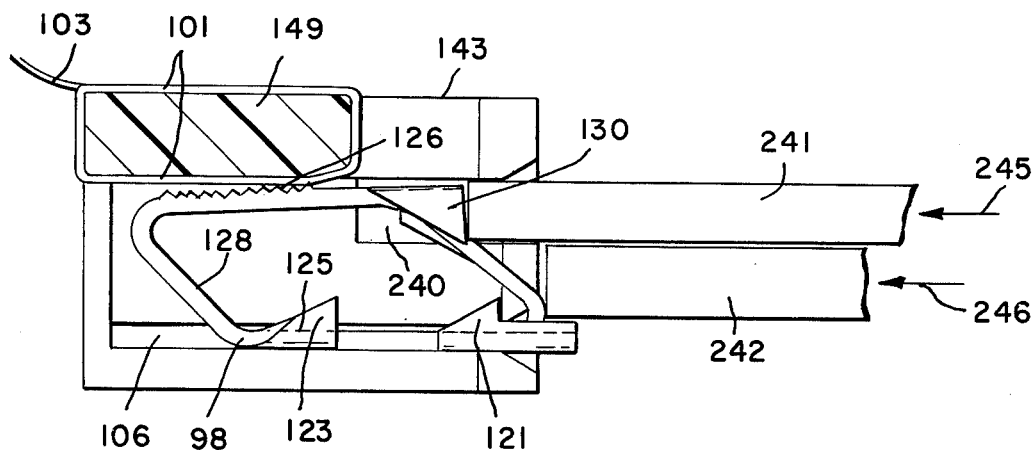
FIGS. 17 and 18 illustrate a two step insertion operation of the terminal into the housing which employs two separate driving means in lieu of a stopping wall.
Figure 18:
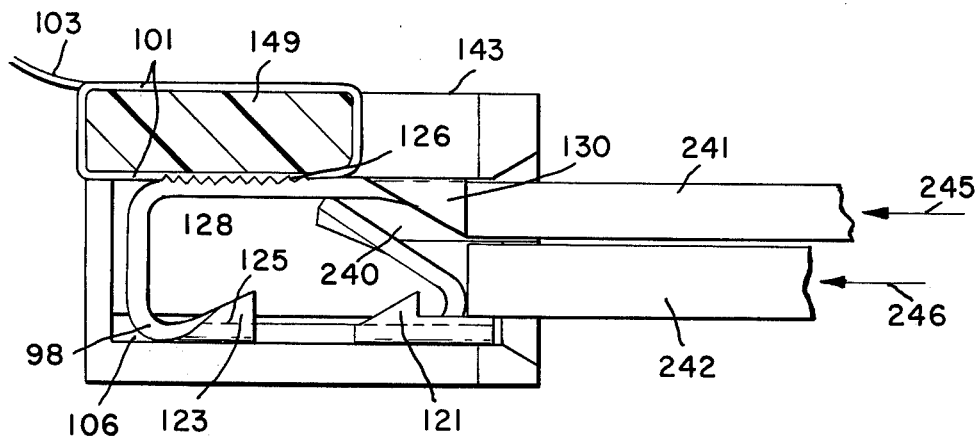

Referring now to FIGS. 17 and 18 there is shown a structure for terminating the fine magnet wire and a method for effecting such termination. More specifically, in FIG. 17 the two driving means 241 and 242 are independently actuated in the direction of arrows 245 and 246, respectively, to move the first side 126 of contact 120 and the second side 125 thereof into the housing 100.

Further, in FIG. 17 the upper driving means 245 is shown as having driven the first side 126 of terminal 120 into housing 100 a desired distance. The edges of the element 130 will have dug into the sides of housing 100 with substantial frictional force to prevent the removal thereof upon release of the driving force of driving element 241, and further to prevent either forward or backward movement of first element 126 in the event of a subsequent force exerted on second side 125 of terminal 120.

In FIG. 17 the second element 125 has been driven into housing 100 by driving element 242 the same distance as the top element 126 by driving element 241. However, the forward or leftward movement of driving element 241 terminates in substantially the position shown in FIG. 17 while the leftward movement of driving element 242 continues, as indicated in FIG. 18. The leftward movement of driving element 242 is calculated to continue until the third side 128 of terminal 120 is in a substantially vertical position as shown in FIG. 18 which will move the first side 126 of terminal 120 in an upward direction to make contact with winding 101 wound around portion 149 of housing 100.

Other means will occur to those skilled in the art to limit the leftward movement of top side 126 of terminal 120 to the left in FIGS. 17 and 18 other than by a stopping wall 150, as shown in FIG. 13b, or by the frictional engagement of element 130 with the side wall of housing 100 as shown in FIGS. 17 and 18, and subsequently permitting a further leftward movement of lower side 126 of terminal 120 in order to effect the straightening of third side 128 of terminal 100 to move the first side 126 into engagement with the winding 101 without departing from the spirit or scope of the invention.

It is to be understood that the forms of the invention shown and described herein are but preferred embodiments thereof and that various changes can be made in both the housing and contact configurations without departing from the spirit or scope of the invention.

I claim:

1. A combination for terminating a fine magnet wire and comprising:
   a fine wire;
   a contact; and
   housing means comprising a cavity formed therein into which said contact is insertable and retainable;
   said contact formed from a strip of metal and comprising:
   first, second and third strip-like elements bent to form three sides of a trapezium and each having inner and outer surfaces generally perpendicular to a common plane;
   said first and third strip-like elements being convergent at first ends thereof and spaced apart a given distance when not inserted in said housing;
   said second strip-like element connected to the first end of said first strip-like element at an acute angle and to the first end of said third strip-like element at an obtuse angle when said contact is not inserted in said housing;
   said first strip-like element having raised areas formed in the outer surface thereof;
   said housing comprising:
   a plurality of side walls and a first end wall defining a cavity therein which opens onto a second end opposite said first end, and a slot extending completely through said housing except for a portion of a first of said side walls;
   said wire wound around said portion of said first side wall;
   said cavity configured to retain the first and second contact elements adjacent said first side wall and said first end wall, respectively, and to retain said third strip-like element adjacent a second side wall;
   the distance between said first and second side walls being greater than said given distance;
   said first end wall positioned to limit the depth of insertion of said first and second strip-like elements into said cavity;
   said cavity further configured to receive and guide said third element further therein after the junction of said first and second strip-like elements abut against said first end wall to move said second strip-like element further towards said first end wall, thereby altering said acute and obtuse angles towards right angles and increasing the distance between the said first and third strip-like elements to force the raised areas of said first strip-like elements against said portion of said first side wall and said wire wound therearound.

2. A combination as in claim 1 in which the said raised areas on said first strip-like means comprise serrations which are forced against said fine wire wound around said portion of said first side wall.

3. A combination for terminating a fine magnet wire and comprising:
   a fine wire;
   a contact; and
   housing means comprising a cavity formed therein into which said contact is insertable and retainable;
   said contact comprising:
   first, second and third strip-like elements arranged to form three sides of a trapezium and each having inner and outer surfaces generally perpendicular to a common plane;
   said first and third strip-like elements being convergent at first ends thereof and spaced apart a given distance when not inserted in said housing;
   said second strip-like element connected to the first end of said first strip-like element at an acute angle and to the first end of said third strip-like element at an obtuse angle when said contact is not inserted in said housing;
   said housing comprising:
   a plurality of side walls and a contact stop means defining a cavity therein which opens onto the surface thereof;
   said wire positioned across a first of said side walls;
   said cavity configured to retain the first and second strip-like elements adjacent said first side wall and said contact stop means, respectively, and to retain said third strip-like element adjacent a second side wall;
   the distance between said first and second side walls being greater than said given distance;
   said stop means positioned to limit the depth of insertion of the junction of said first and second strip-like elements into said cavity;
   said cavity further configured to receive said third element further therein after the junction of said first and second strip-like elements abuts against said stop means to move said second strip-like element further towards said stop means, thereby altering said acute and obtuse angles towards right angles and increasing the distance between the said first and third strip-like elements to force the outer surface of said first strip-like element against said first side wall and said wire positioned thereacross.

4. A combination as in claim 3 in which the said first strip-like element has serrations formed on the outer surface thereof which is forced against said first side wall.

5. A combination for terminating a fine magnet wire and comprising:
   a fine wire;
   a contact; and
   housing means comprising a cavity formed therein into which said contact is insertable and retainable;
   said contact comprising:
   three strip-like legs connected together to form a U-shaped configuration with the two legs of the U-being convergent at the closed end thereof and spaced apart a given distance when not inserted in said housing;
   the transverse leg of said U being connected to the first leg of said two legs at an acute angle and to the second leg of said two legs at an obtuse angle when said contact is not inserted in said housing;
   said housing comprising:
   a plurality of walls and a stop means defining a cavity therein which opens onto a given surface thereof;
   said fine wire being positioned across a first of said walls;
   said cavity configured to retain the first leg and said transverse leg adjacent said first wall and said stop means, respectively, and to retain said second leg adjacent a second wall;
   the distance between said first and second walls being greater than said given distance;

said stop means positioned to limit the depth of insertion of the junction of said first leg and said transverse leg into said cavity;

said cavity further configured to receive and guide said second leg further therein after the junction of said first leg and said transverse leg abuts against said stop means to move said transverse leg further towards said stop means, thereby altering said acute and obtuse angles toward right angles and increasing the distance between the said first and second legs to force said first leg against said first wall and said fine wire.

6. A combination as in claim 5 in which said first leg has serrations formed on that surface thereof which is forced against fine wire positioned across said first wall.

7. An apparatus for terminating a fine wire comprising:

a contact;

a housing constructed to retain said contact and to cooperate with said contact upon the insertion of said contact therein to compress said fine wire between said contact and a given surface of said housing;

said contact comprising:

first, second and third strip-like elements connected together to form three sides of a trapezium each having inner and outer surfaces generally perpendicular to a common plane;

said first and third strip-like elements being convergent to each other at first ends thereof and spaced apart a given distance when said contact is not inserted into said housing; and said second element connected to said first end of said first strip-like element at an acute angle and to said first end of said third strip-like element at an obtuse angle when said contact is not inserted into said housing;

said housing comprising:

a plurality of side walls, a contact stop means, and a cavity formed therein and opening onto the surface of said housing;

said cavity configured to receive and retain the first and second strip-like contact elements adjacent said first side wall and said stop means, respectively, and having said stop means positioned to limit the depth of insertion of said first and second strip-like elements into said cavity;

said cavity further configured to receive said third strip-like element into said housing in a position adjacent a second side wall spaced from said first side wall a distance greater than said given distance and to continue to receive said third strip-like element further therein after the junction of said first and second strip-like elements has abutted against said contact stop means, thereby moving said second strip-like element further towards said contact stop means to cause said acute and obtuse angles to approach right angles and thereby force said first strip-like element against said given surface of said housing in a direction transverse to the plane of said given surface;

means for positioning said fine wire across said given surface of said housing prior to inserting said contact into said cavity; and driving means for forcing said contact into said cavity.

8. An apparatus as in claim 7 in which the said first strip-like element has serrations formed on that surface thereof which is forced against said given surface of said housing.

9. An apparatus for terminating a fine wire comprising:

a contact;

a housing constructed to retain said contact therewithin and to cooperate with said contact upon the insertion of said contact therein to compress said fine wire between a given surface of said contact and a given surface of said housing;

said contact being formed from a strip of metal and comprising:

first, second and third strip-like elements connected together to form three sides of a trapezium each having inner and outer surfaces generally perpendicular to a common plane;

said first and third strip-like elements being convergent to each other at first ends thereof and spaced apart a given distance when said contact is not inserted into said housing; and said second element connected to said first end of said first strip-like element at an acute angle and to said first end of said third strip-like element at an obtuse angle when said contact is not inserted into said housing;

said housing comprising:

a plurality of side walls, a first end wall and a cavity formed therein and opening onto the second end thereof; and a slot extending completely through said housing except for a portion of a first of said side walls which includes said given surface;

said cavity configured to receive and retain the first and second strip-like contact elements adjacent said first side wall and said first end wall, respectively, and having said first end wall positioned to limit the depth of insertion of said first and second strip-like elements into said first cavity portion;

said cavity further configured to receive said third strip-like element into said housing in a position adjacent a second side wall spaced from said first side wall a distance greater than said given distance and to continue to receive said third strip-like element further therein after the junction of said first and second strip-like elements has abutted against said first end wall, thereby moving said second strip-like element further towards said first end wall to cause said acute and obtuse angles to approach right angles and thereby force said first strip-like element against said given surface of said housing and the wire wound thereacross in a direction transverse to the plane of said given surface;

means for winding said fine wire into said slot and around said portion of said one of said side walls including said given surface prior to inserting said contact into said cavity; and driving means for forcing said contact into said cavity.

10. An apparatus as in claim 9 in which the said first strip-like element has serrations formed on that surface thereof which is forced against said given surface of said housing.

11. An apparatus for terminating a fine wire comprising:

a contact;

a housing having a cavity formed therein and constructed to retain said contact within said cavity and to cooperate with said contact upon the insertion of said contact therein to compress said fine wire between a given surface of said contact and a first given surface within the cavity of said housing;

said contact being formed from a strip of metal and comprising:

three strip-like legs connected together to form a U-shaped configuration with the two legs of the U being convergent at the closed end thereof and spaced apart a given distance when not inserted in said housing;

the transverse leg of said U being connected to the first leg of said two legs at an acute angle and to the second leg of said two legs at an obtuse angle when said contact is not inserted into said housing;

said housing comprising:

a plurality of walls and a stop means defining said cavity formed therein which opens onto a second given surface thereof;

said cavity configured to receive and retain the first and second legs adjacent said given surface and said stop means, respectively, and having said stop means positioned to limit the depth of insertion of said first leg and said transverse leg into said cavity;

said cavity further configured to receive said second leg into said housing in a position adjacent a first of said walls spaced from said first given surface a distance greater than said given distance and to continue to receive said second leg further therein after the junction of said first leg and said transverse leg has abutted against said stop means, thereby moving said transverse leg further towards said stop means to cause said acute and obtuse angles to approach right angles and thereby force said first leg against said first given surface in a direction transverse to the plane of said given surface;

means for positioning said fine wire across said first given surface prior to inserting said contact into said cavity; and driving means for forcing said contact into said cavity.

12. An apparatus combination as in claim 11 in which the said first leg has serrations formed on that surface thereof which is forced against said first given surface and the fine wire positioned thereacross.

13. A method of terminating a fine wire comprising the steps of:

forming a housing having a contact retaining cavity therein defined by walls;

positioning the fine wire across a given wall surface of said housing;

shaping a contact to form a U-shaped configuration with the two legs of the U being convergent at the closed end thereof and spaced apart a given distance and with the transverse element forming an acute angle with the first leg of said two legs when said contact is not inserted in said cavity;

inserting said contact into said cavity, the junction of said first leg and said transverse element first, and with said second leg moving in its own plane;

stopping the insertion of the junction of said first leg and said transverse leg by stop means within said housing;

continuing the insertion of said second leg into said cavity to cause said acute angle to approach a right angle to move said transverse leg against said given wall surface in a direction substantially transverse to said given wall surface.

14. A method of terminating a fine wire comprising the steps of:

forming a housing having a contact retaining cavity therein defined by walls;

positioning the fine wire across a given wall surface of said housing;

shaping a contact to form three sides of a trapezium with the center element forming an acute angle with the second element and with the second and third elements being convergent at the ends thereof connected to said center element;

inserting said contact into said cavity, the junction of said second element and said center element first, and with said third element moving in its own plane;

stopping the insertion of the junction of said second and center elements by stopping means within said housing;

continuing the insertion of said third element into said cavity to cause said acute angle to approach a right angle to move said second element against said given wall surface in a direction substantially transverse to said given wall.

15. A method of terminating a fine wire comprising the steps of:

forming a housing having a contact receiving cavity therein defined by side walls and an end wall;

winding the fine wire around a given side wall of said housing;

forming a contact having three, strip-like elements arranged to form three sides of a trapezium with the center strip-like element forming an acute angle with the second element and an obtuse angle with the third element and with the second and third elements being convergent at the ends thereof connected to said center element;

inserting said contact into said cavity, center element first, and with said third element moving in a plane substantially parallel with the direction of insertion;

stopping the insertion of the junction of said second and center elements by said end wall;

continuing the insertion of said third element into said cavity to push said center element towards flush engagement with said end wall to cause said acute and obtuse angles to approach right angles and to move said second element against said given side wall in a direction substantially transverse to said given side wall.

16. An apparatus for terminating a fine wire comprising:

a contact;

a housing having a cavity formed therein and constructed to retain said contact within said cavity and to cooperate with said contact upon the insertion of said contact therein to compress said fine wire between a given surface of said contact and a first given surface within the cavity of said housing;

said contact being formed from a strip of metal and comprising:

three strip-like legs connected together to form a U-shaped configuration with the two legs of the U being convergent at the closed end thereof and spaced apart a given distance when not inserted in said housing;

the transverse leg of said U being connected to the first leg of said two legs at an acute angle and to the second leg of said two legs at an obtuse angle when said contact is not inserted into said housing;

said housing comprising:

a plurality of walls defining said cavity formed therein which opens onto a second given surface thereof;

said cavity configured to receive and limit the depth of insertion of said first leg into said cavity to a given depth;

said cavity further configures to receive said second leg into said housing in a position adjacent a first of said walls spaced from said first given surface a distance greater than said given distance and to continue to receive said second leg further therein after said first leg has been inserted said given depth, thereby moving said transverse leg to cause said acute and obtuse angles to approach right angles and force said first leg against said first given surface in a direction transverse to the plane of said given surface;

means for positioning said fine wire across said first given surface prior to inserting said contact into said cavity; and driving means for forcing said contact into said cavity.

17. A method of terminating a fine wire comprising the steps of:

forming a housing having a contact retaining cavity therein defined by walls;

positioning the fine wire across a given wall surface of said housing;

shaping a contact to form a U-shaped configuration with the two legs of the U being convergent at the closed end thereof and spaced apart a given distance and with the transverse element forming an acute angle with the first leg of said two legs when said contact is not inserted in said cavity;

inserting said contact into said cavity, the junction of said first leg and said transverse element first, and with said second leg moving in its own plane;

stopping the insertion of said first leg by frictional engagement of said first leg with said housing; and continuing the insertion of said second leg into said cavity to cause said acute angle to approach a right angle to move said transverse leg against said given wall surface in a direction substantially transverse to said given wall surface.

18. A combination for terminating a fine magnet wire and comprising:

a fine wire;

a contact; and housing means comprising a cavity formed therein into which said contact is insertable and retainable;

said contact comprising:

three strip-like legs connected together to form a U-shaped configuration with the two legs of the U being convergent at the closed end thereof and spaced apart a given distance when not inserted in said housing;

the transverse leg of said U being connected to the first leg of said two legs at an acute angle when said contact is not inserted in said housing;

said housing comprising:

a plurality of walls defining a cavity therein which opens onto a given surface thereof;

said fine wire being positioned across a first of said walls;

said cavity configured to retain said first leg adjacent said first wall, and to retain said second leg adjacent a second wall;

the distance between said first and second walls being greater than said given distance;

said cavity constructed to limit the depth of insertion of said first leg into said cavity a second distance;

said cavity further configured to receive said second leg further therein after said first leg has been inserted into said cavity said second distance to move said transverse leg in a direction to alter said acute angle toward a right angle and thereby increase the distance between the said first and second legs to force said first leg against said first wall and said fine wire.

19. A combination for terminating a wire comprising:

a wire;

a contact;

a housing means having a recess formed therein with an opening into which said contact is insertable and retainable in said recess;

said contact comprising:

first, second and third plate-like elements bent in a generally U-shaped configuration with the first and third plate-like elements being convergent at first ends thereof and with said first ends being spaced apart a first given distance when said contact is not inserted in said housing means;

said second plate-like element connected between the first ends of said first and third plate-like elements and forming an acute angle with said first plate-like element when said contact is not inserted in said housing means;

said housing means comprising a top wall and a bottom wall with facing surfaces, and a contact stop means which define said recess and which has an opening opposite said contact stop means;

said wire being positioned across at least a portion of the surface of said top wall which faces said bottom wall;

said recess configured to retain the first and third plate-like elements adjacent said top wall and said bottom wall respectively;

the distance between said top and bottom walls being greater than said given distance;

said contact stop means positioned to limit to a second given distance the insertion of one of said first or third strip-like elements into said recess;

said recess further configured to receive the other of said first or third plate-like element farther therein after said one of said first or third plate-like elements has entered said recess said second given distance to move said second plate-like element in a direction to alter said acute angle towards a right angle and thereby increase the distance between the first and third plate-like elements to force said first plate-like element against said top wall and said wire.

* * * * *